(12) United States Patent
Lai et al.

(10) Patent No.: US 7,872,983 B2
(45) Date of Patent: Jan. 18, 2011

(54) RELIABILITY METRICS IN AN IP NETWORK

(75) Inventors: Wai Sum Lai, Matawan, NJ (US); Yonatan Levy, Manalapan, NJ (US); Farhad Saheban, Aberdeen, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 156 days.

(21) Appl. No.: 12/206,414

(22) Filed: Sep. 8, 2008

(65) Prior Publication Data

US 2010/0061255 A1   Mar. 11, 2010

(51) Int. Cl.
    *H04L 12/26* (2006.01)
(52) U.S. Cl. ..................................... 370/252
(58) Field of Classification Search .............. 370/252, 370/352–356, 401, 395.52
See application file for complete search history.

(56) References Cited

U.S. PATENT DOCUMENTS

| 6,003,090 | A | 12/1999 | Puranik et al. | |
|---|---|---|---|---|
| 6,704,289 | B1 | 3/2004 | D'Souza et al. | |
| 6,747,957 | B1 | 6/2004 | Pithawala et al. | |
| 6,862,291 | B2 * | 3/2005 | Talpade et al. | 370/412 |
| 2006/0067298 | A1 * | 3/2006 | Houck et al. | 370/352 |
| 2006/0256724 | A1 * | 11/2006 | Martini et al. | 370/238 |
| 2007/0217419 | A1 * | 9/2007 | Vasseur | 370/392 |
| 2008/0219268 | A1 * | 9/2008 | Dennison | 370/395.2 |
| 2009/0154359 | A1 * | 6/2009 | Strutt et al. | 370/238 |
| 2010/0177634 | A1 * | 7/2010 | Kiss et al. | 370/230 |

OTHER PUBLICATIONS

C.M. Hamilton, "Telecommunication-Network Dependability: a Baseline on Local Exchange Network Availability," Proc. IEEE Reliability and Maintainability Symposium, 1991, 29-31, pp. 39-43 (Jan. 1991).

C.R. Johnson, Y. Kogan, Y. Levy, F. Saheban and P. Tarapore, "VoIP Reliability: A Service Provider's Perspective," IEEE Communication Magazine (Jul. 2004).

M. Vogt, R. Martens, T. Andvaag, "Availability Modeling of Services in IP Networks," Proc. 4th International Workshop on Design of Reliable Communication Networks (DRCN), pp. 167-172 (2003).

G. Choudhury, M. Eisenberg, D. Hoeflin, Y. Kogan, D. Luan and J. Medamana, "New Reliability Metrics and Measurement Techniques for IP Networks," submitted to the Five Nines Workshop (2007).

Choudhury, G., et al. "New Reliability Metrics and Measurement Techniques for IP Networks", Five Nines Workshop, pp. 126-130, 2007.

Hamilton, Clinton, "Telecommunications-Network Dependability: A Baseline on Local-Exchange Network Availability", IEEE Reliability and Maintainability Symposium, pp. 39-43, 1991.

Johnson, Carolyn, et al. "VoIP Reliability: A Service Provider's Perspective", IEEE Communications Magazine, pp. 48-54, Jul. 2004.

Vogt, Murray et al. "Availability Modeling of Services in IP Networks", Proceedings 4th International Workshop on Design of Reliability Communications Networks (DRCN) (IEEE), pp. 167-172, Oct. 2003.

* cited by examiner

*Primary Examiner*—Kwang B Yao
*Assistant Examiner*—Candal Elpenord
(74) *Attorney, Agent, or Firm*—Hoffmann & Baron, LLP

(57) ABSTRACT

Embodiments of the present invention are directed to characterizing reliability associated with a network. To characterize the reliability, an edge-pair reliability metric is determined for service edge point pairs. An end-to-end reliability metric is computed based on a distribution of the edge-pair reliability metric for the service edge point pairs and a threshold value.

20 Claims, 5 Drawing Sheets

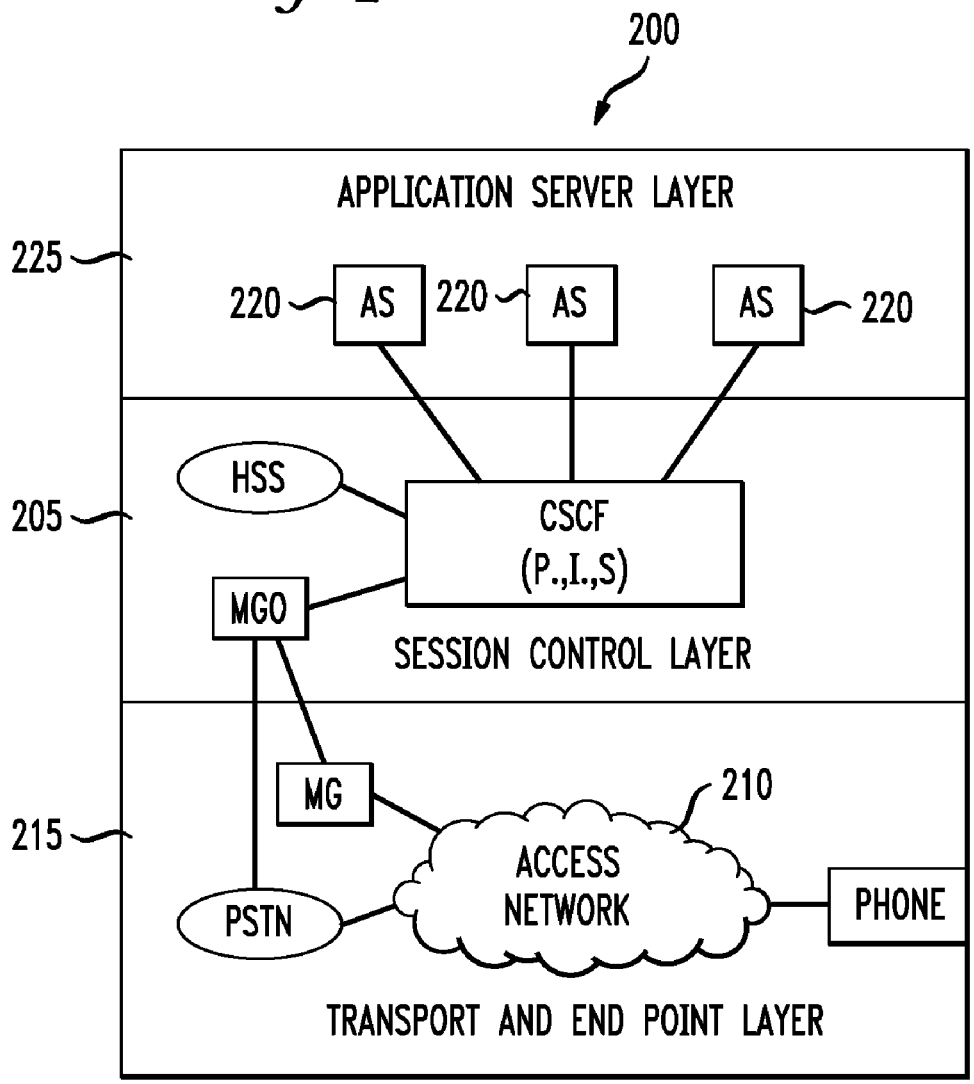

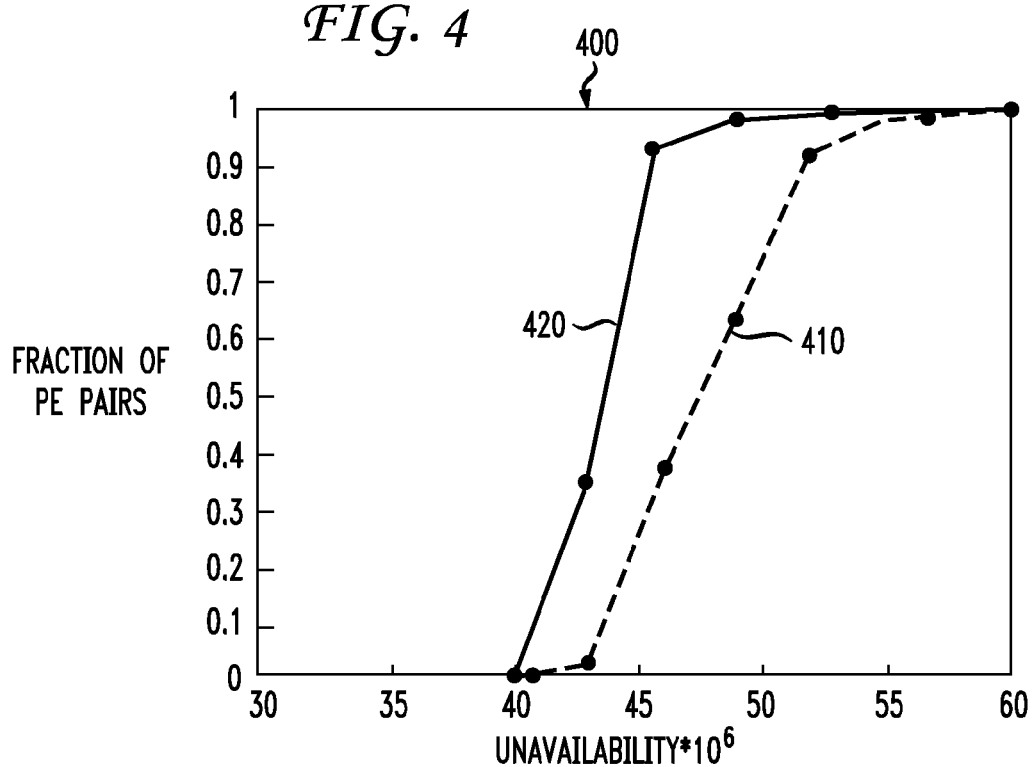
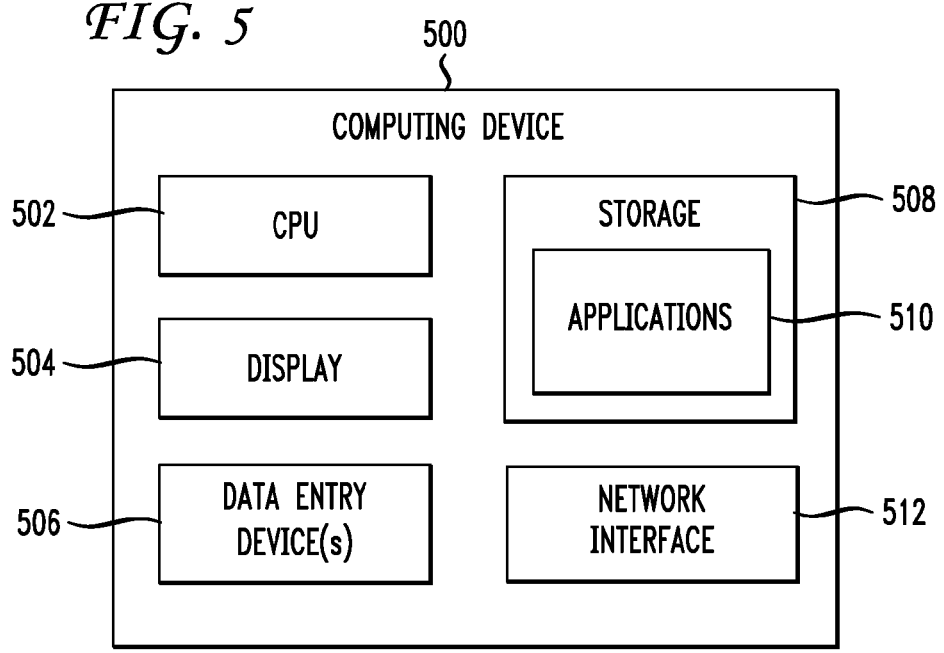

RELIABILITY METRICS IN AN IP NETWORK

BACKGROUND OF THE INVENTION

1. Field of the Invention

The present invention relates to reliability metrics for communication networks, and specifically to defining and determining end-to-end reliability metrics for such networks and a service offered over such networks.

2. Brief Discussion of Related Art

Availability estimation in a public switched telephone network (PSTN) typically relies on the concept of a reference connection. The reference connection usually consists of a single path through the PSTN from one end user to another, including the major network segments needed to connect two telephone subscribers served by two different central office switches. A static allocation of end-to-end objectives to different network segments is used to meet specific availability requirements. This conventional approach is often used for availability standards.

Typically the level of availability is defined in a customer service agreement, where the service provider agrees to maintain the availability at the specified level. For example, in such an agreement, five-9 availability or 99.999% availability is defined as the level of availability to be provided. Availability is typically a time average measure based on an amount of time that a reference connection or a specified part of the network is unavailable for some specified time period.

In reality, end-to-end availability can vary significantly among different end points. For IP networks, a model of an end-to-end reference path between provider-edge (PE) routers and an associated reliability model can be developed. However, IP application flows can take different paths within the network and the reference connection typically provides the availability of one route between a pair of PE routers in the core IP network with the assumption that all routes, or at least a large fraction of them, have a similar availability. These considerations render the concept of a reference connection less effective for IP networks.

SUMMARY OF THE INVENTION

In the embodiments of the present invention, reliability associated with a network can be computed. The preferred embodiments of the present invention determine a distribution of an edge-pair reliability metric for service edge point pairs and compute an end-to-end reliability metric based on the distribution of the edge-pair reliability metric for service edge point pairs and a threshold value. In some embodiment, the end-to-end reliability metric can be computed by dividing the number of the edge-pairs that exceed the threshold value by the number of edge pairs in the network. In other embodiments, the end-to-end reliability metric can be computed by identifying a value corresponding to a certain percentile of the edge-pair reliability distribution.

In some embodiments, a value of an edge-pair reliability metric for provider service edge point pairs can be determined by determining possible paths between the service edge point pairs and calculating a reliability of the possible paths. In some embodiments, a distribution of edge-pair reliability can be determined by weighting the edge pair reliability metric based on at least one of the bandwidth of a path between edge-pairs and the amount of traffic between the edge-pairs.

In some embodiments, a value of the reliability metric can be determined based on a topology of the network, model data, historical data, and/or production data. The end-to-end reliability metric can be associated with an availability of the network and/or can be associated with an availability of a service offered over the network, such as a Voice over IP (VoIP) service. Some embodiments of the present invention can determine whether to incorporate additional nodes/links in the network to increase the end-to-end reliability based on a value of the end-to-end reliability metric.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 2 is a block diagram of a functional architecture of a network configured with an Internet Protocol (IP) Multimedia Subsystem (IMS).

FIG. 4 is an exemplary distribution of an edge-pair reliability for service edge point pairs.

FIG. 5 is an exemplary computing device for implementing a preferred embodiment of the present invention.

DETAILED DESCRIPTION OF THE PREFERRED EMBODIMENTS

Figure 1:
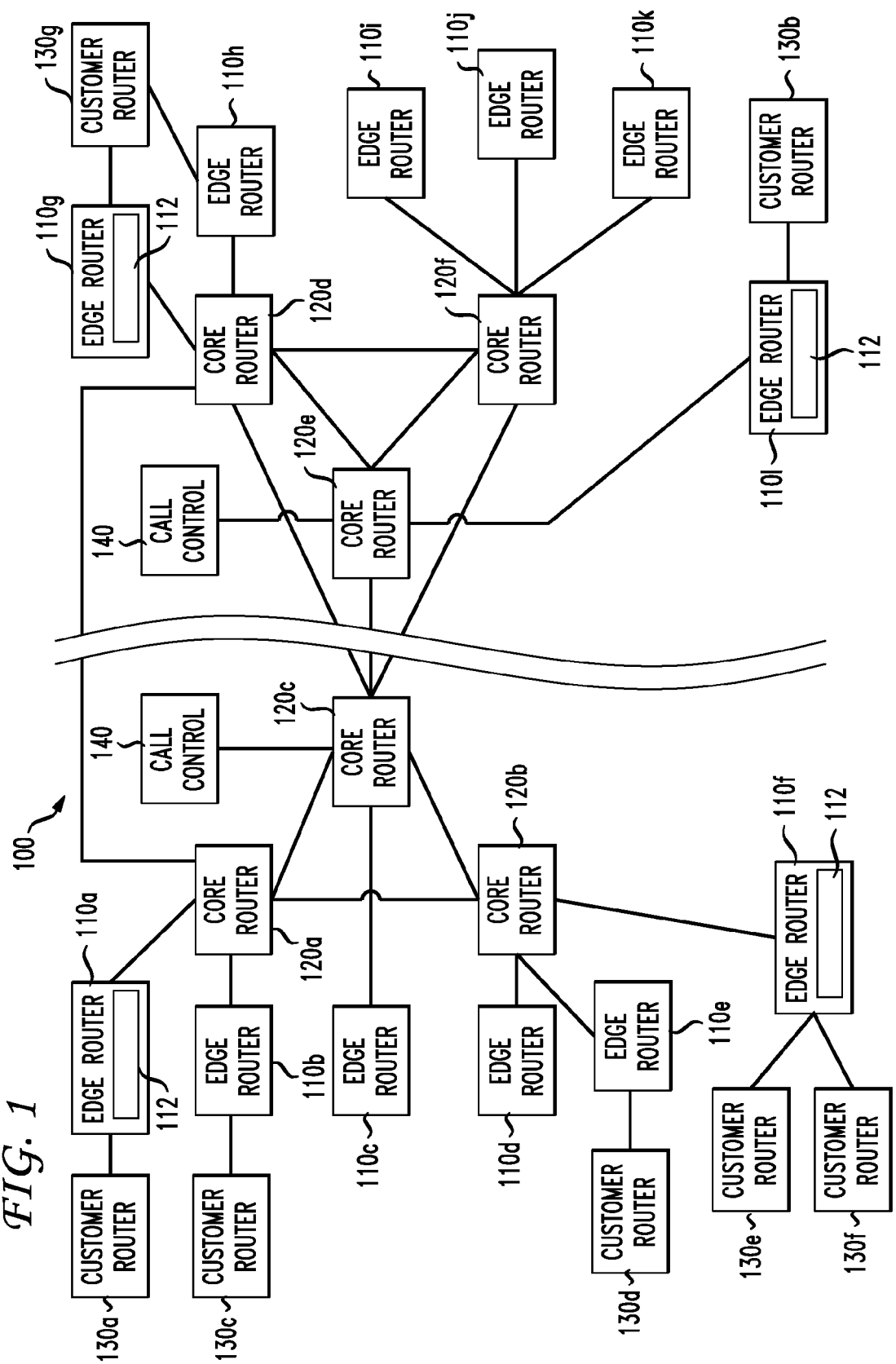
FIG. 1 is an exemplary IP network, for which reliability metrics can be defined and computed.

In the embodiments of the present invention, effective management of Internet protocol (IP) network reliability and of services offered over such a network can be achieved by defining reliability metrics that reflect users' experience. Models can be used to estimate the reliability metrics during design and development of the network and/or the services implemented over the network, and methods can be developed for measuring the reliability metrics once the network and/or services are deployed so that actual network and/or service reliability metrics can be tracked and managed.

The embodiments of the present invention are directed to an approach for identifying, specifying, and computing values of reliability metrics, such as availability, defects per million (DPM), and the like for Internet protocol (IP) communication networks and services offered over such networks. The reliability metrics are preferably computed on an end-to-end basis, which customers can use to measure, monitor, and validate the conformance of providers with their service level agreements. Those skilled in the art will recognize that other network performance metrics such as end-to-end delay can also be determined using the preferred embodiments of the present invention.

The preferred embodiments can provide an estimation of a reliability metric for edge-pairs (e.g., Provider Edge router pairs) to provide a distribution that is spatial (concatenation in space), rather than temporal (aggregation over different time intervals). As an example, using the preferred embodiments of the present invention, availability of 99.999%, often referred to as five-9 availability, can be characterized not as a time average measure of a reference path, but as a fraction of network edge-pairs that meet that level of availability. The preferred embodiments can also identify specific pairs of edges that may experience lower availability than required.

A "path", as used herein, refers to a sequence of nodes and links through which data traverses in a network between provider edge routers.

As used herein, a "node" refers to a device associated with a network, such as a provider edge router, a core router, a call control device, session border controller, customer router, and the like.

As used herein, an "edge-pair reliability metric" refers to a quantity associated with one or more paths in a network between a service edge point pair to identify a characteristic for the service edge point pair, such as a reliability characteristic including a level of availability associated with the service edge point pair. Some examples of edge-pair metrics include path availability associated with the service edge point pair (edge-pair), defects per million, and the like. A "service edge point" refers a node associated with the edge of the network, such as a provider edge (PE) router, a session border controller, a customer router, and the like.

As used herein, an "end-to-end reliability metric", such as a network reliability metric or a service reliability metric, refers to a quantity that can be determined based on the value of edge-pair metrics for one or more edge-pairs (i.e. service edge point pairs) in a network. End-to-end reliability metrics provide a measure of characteristics of the network, such as a level of reliability of the network, or a measure of characteristics of a service offered over the network, such as availability of the service. Some examples of an end-to-end reliability metric include availability associated with the network or a service offered over the network, defects per million in the network, and the like.

As used herein, "availability" refers to a percentage of time a network, an edge-pair, a path in the network, and/or a service provided over the network is operational and/or functional, and "unavailability" refers to an inability to connect to the network, an inability to connect a source and a destination, and/or an inability to use a service offered over the network.

FIG. 1 is an exemplary portion of an IP network 100 (hereinafter "network 100"). The network 100 can include nodes, such as provider edge (PE) routers 110a-l, which can include Session Border Controllers 112, and core routers 120a-f, the implementation of each being generally known to those skilled in the art, which are connected by links, such as a conductive material, fiber optic material, a wireless connection (e.g., radio frequencies, satellite communication), and the like. Customers typically connect to the network 100 via the PE routers 110a-l. For example, a customer router 130a can connect to the PE router 110a and a customer router 130b can connect to the edge router 110l to allow customer routers 130a-b to communicate with each other and with other customer routers connected to the network 100.

Data packets can be transmitted over the network 100 from one customer router to another through the PE routers 110 and core routers 120. The PE router, through which the data packet enters the network 100, can be referred to as a source PE router and the PE router, through which the data packet exits the network, is referred to as a destination PE router. These data packets include, for example, a destination address, data, and a header. The destination of the data packet is generally a customer router (e.g., customer routers 130a-g) and the path that the data packet travels is generally formed based on the destination. The network 100 can provide multiple paths between two PE routers (a PE router pair or edge-pair). In some embodiments, a preferred path between PE router pairs can be established such that data packets generally traverse the preferred path to reach the destination. In these embodiments, alternate paths may be used when there is a problem with the preferred path. In other embodiments, the data packets may traverse any one of the paths with substantially equal probability.

In some embodiments, the network 100 can support services, such as voice-over-IP (VoIP), referred to herein as "data", and the like. As an example, VoIP can be supported by one or more call control devices 140, such as IP multimedia subsystems (IMS), to provide an end-to-end IP service. Although embodiments are discussed with reference to an IMS network configuration and a VoIP service to illustrate an implementation of an end-to-end service, those skilled in the art will recognize that other network configurations can be implemented to provide end-to-end services, such as tele- and video-conferencing, electronic commerce, and remote medical services.

FIG. 2 is a block diagram of a functional architecture of an IMS configuration 200. IMS is well known to those skilled in the art as a networking architecture for the delivery of VoIP and other multimedia services. For a network service implementation that uses IMS, a horizontal control plane 205 with a set of generic functions can be defined such that an access network 210 in a user/transport plane 215 is isolated from a service layer 220 in an application plane 225. The horizontal architecture provides independence from access technology for network convergence and provides reuse of common functions for multiple applications. Users can be either wired or wireless and can share the service infrastructure. The control plane 200 can use a Call Session Control Function (CSCF) for Session Initiation Protocol (SIP) session management and call control, such as call admission and signaling of a VoIP call.

Phases in a VoIP call flow can include a connection phase, a media phase, and a tear down phase. In the connection phase, a connection is set up between a calling and called party. In the media phase, coded speech can be streamed between the connected calling and called parties. In the tear down phase, the connection between the parties is torn down and the resources associated with the call are released. IMS configurations can use SIP over IP for signaling in the connection and tear down phases, and a Real-Time Transport Protocol (RTP) over IP for the media phase. The connection, media, and tear down phases can be carried by the same IP network, although each phase may traverse a different subset of elements in the network.

Both SIP and RTP are end-to-end protocols. Hence, the traffic for signaling and media streaming of a call travels between the SIP phones at user locations. Typically, Session Border Controllers (SBCs) are used by service providers to exert control over the traffic. SBCs can be deployed at network edges, in the signaling and/or media streaming paths between the calling and called parties, to provide signaling security, firewall capability, and policing of media traffic. In some embodiment, the SBCs are implemented within the PE routers of the network. In other embodiments, the SBCs can be implemented as distinct devices in the network.

Figure 3A:
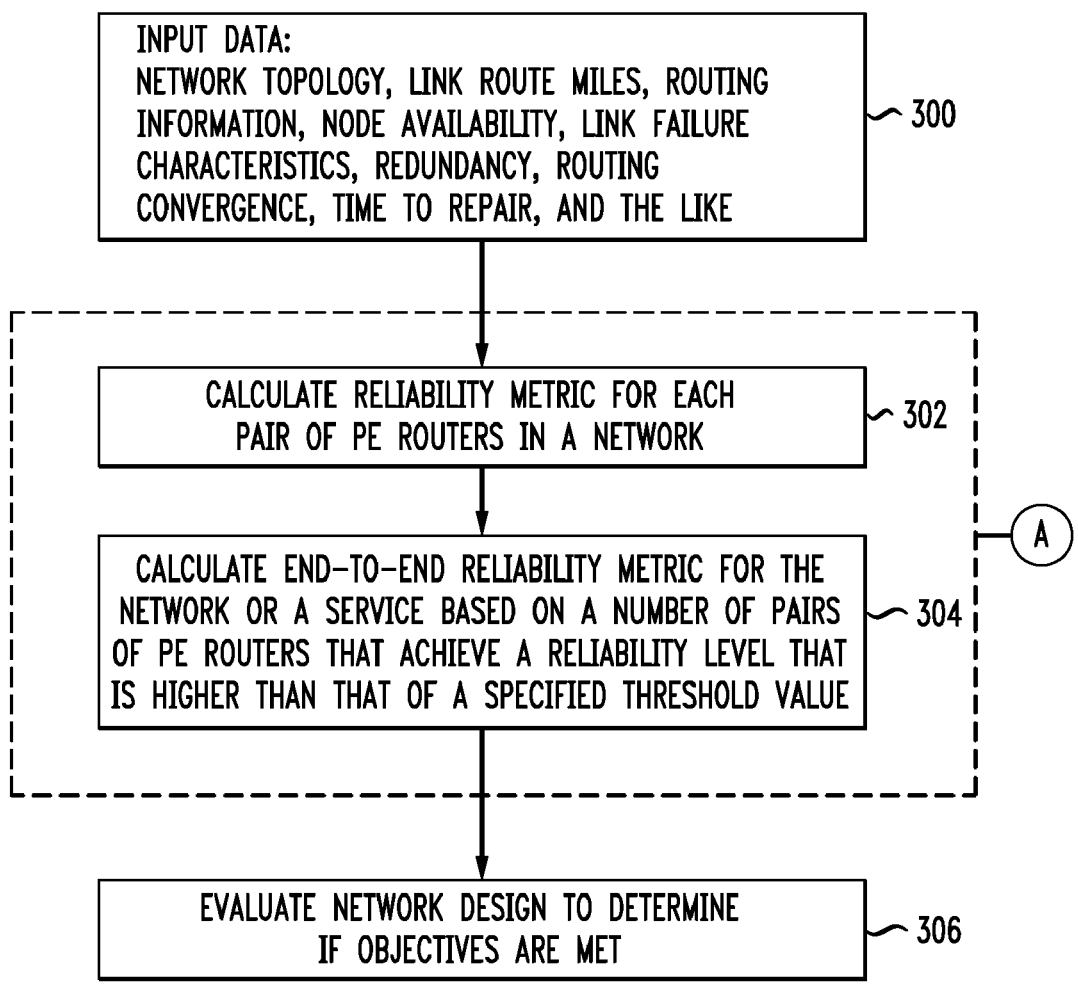
FIG. 3A is a flowchart illustrating a preferred embodiment of the present invention.

FIG. 3A is a flowchart illustrating an embodiment for establishing an end-to-end network reliability metric for an IP network and/or an end-to-end service reliability metric for a service provided over the IP network. To begin, information associated with the network can be gathered as input data for deriving a distribution of edge-pair reliability metrics (step 300). The information gathered can include information associated with the network topology, link route miles (or air-mile to route-mile conversion), routing information, node reliability metrics (e.g., node availability), link failure characteristics, redundancy, routing convergence, time to repair, and the like.

Node reliability metrics, such as node availability, for all types of edge nodes (e.g., PE routers and/or SBCs) and core nodes (e.g., core routers), can be obtained from the reliability analysis of a nodal model based on various components such as ports, line cards, and processor modules using historical, statistical, and/or measured data. Improved estimation of node reliability may be done as more field data becomes available. In some embodiments, node availability can be derived by assuming a typical 4-hour mean time to restore service (MTTR), or using actual data for service restoration related to hardware and software failures.

Link failure characteristics include link reliability data, such as failures in time per mile (FITs/mile). A FIT is a unit of reliability, where 1 FIT=1 failure per billion hours. A simple network model can assume that all links have the same failure rate and a more complex model may take into account varying risk levels based on geography and history of natural and man-made disasters. Alternatively, the availability of individual nodes or links can be incorporated in the model to avoid the simplifying assumption of uniform failure characteristics since paths for each PE router pair can be identified, given that the network topology and routing method are known. This can require more data and increase the computation time.

Information regarding redundancy, routing convergence, and time to repair can be used when deriving edge-pair reliability. Depending on the design of the network, and routing method used, failures can be restored automatically, manually, or cause service unavailability until a repair is done. The recovery/repair time can vary from a simple model with a coverage factor, which is the probability that automatic restoration is successful, to a detailed model of routing convergence behavior.

Using a combination of the above input data, edge-pair reliability can be calculated for service edge point pairs in the network, such as PE router pairs, such that a distribution of the edge-pair reliability is obtained for the possible paths between service edge point pairs (step 302). As one example, a service provider may wish to calculate the end-to-end availability of a network or service (e.g., an end-to-end reliability metric). The service provider can identify pairs of PE routers in the network and calculate the availability for the pairs of PE routers to form a distribution of edge-pair availability (e.g., edge-pair reliability metric). In some embodiments, high percentiles of the edge-pair reliability metric distribution can be used as a metric to characterize the overall availability of the network. In this case, the network reliability metric is defined as the availability level so that a specified fraction of the edge pairs have availability exceeding that level. In other embodiments, the approach can weigh the availability of a path with the bandwidth of its bottleneck link or the availability of an edge-pair with (actual or forecasted) traffic.

Using the distribution of the calculated edge-pair reliability metric for the pairs of service edge point pairs, an end-to-end reliability metric (e.g., end-to-end network reliability metric or end-to-end service reliability metric) for the network, or services provided over the network, can be calculated based on a number of pairs of PE routers that achieve a reliability level that is higher than that of a specified threshold value, such as a reliability level specified in a service agreement (step 304). The network design can be evaluated to determine whether desired reliability levels are met (step 306). If the desired reliability levels, such as a desired level an end-to-end availability, are not met, it can be determined that additional nodes and/or links need to be added to the network topology, or redundancy in certain parts of the network needs to be enhanced to achieve these desired objectives.

In some embodiments, an end-to-end reliability metric can be calculated by dividing the number of service edge pairs that exceed the specified value by a number of service edge pairs in the network (e.g., a total number of PE router pairs in the network). For example, for end-to-end availability, the number of PE router pairs that exceed a specified availability value of 99.999% are identified and are divided by the total number of PE router pairs to obtain a characterization of the end-to-end availability of a service or network (network reliability metric).

Figure 3B:
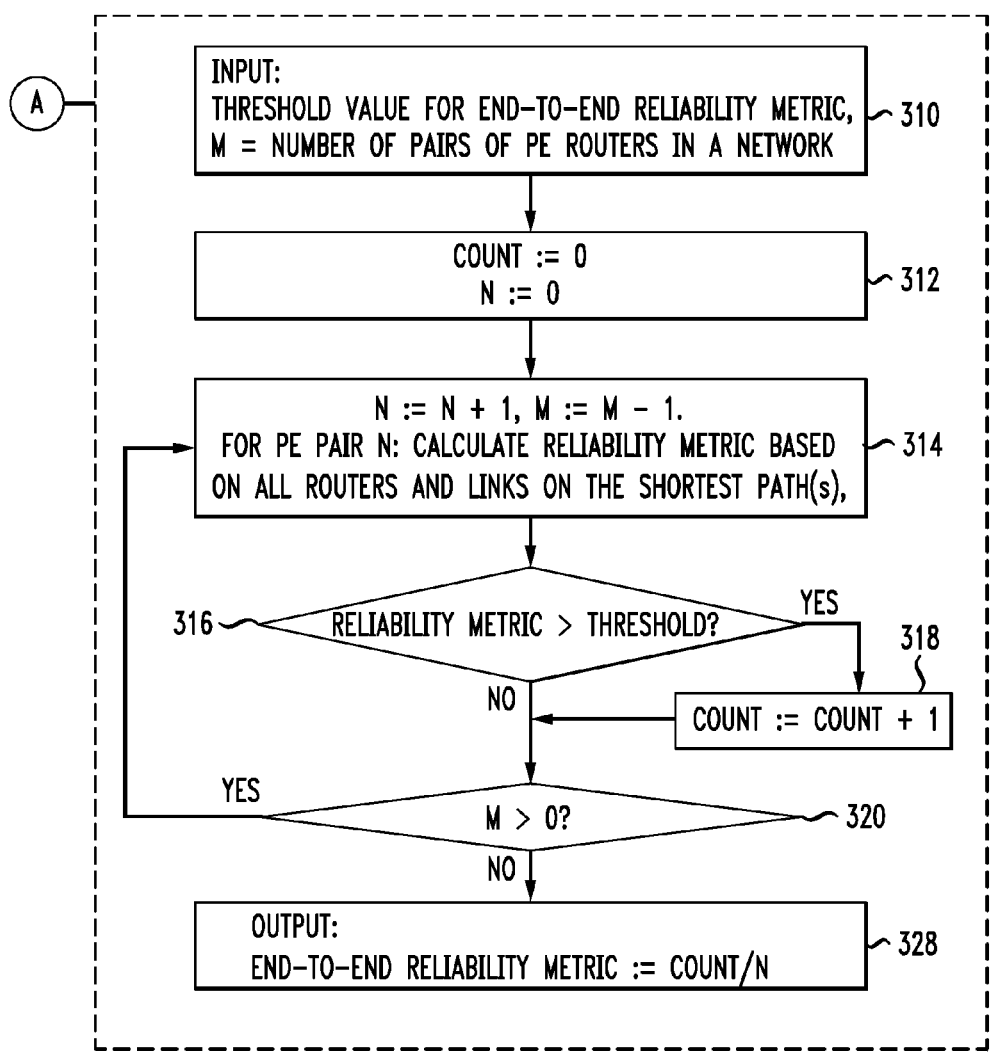
FIG. 3B is a flowchart illustrating one embodiment for computing an end-to-end reliability metric.

FIG. 3B illustrates one embodiment for calculating an edge-pair reliability and calculating an end-to-end reliability metric based on the edge-pair reliability metric. To begin, the threshold value is identified and a number of service edge pairs in the network is identified, to which a variable M is set (step 310). A counter "Count" and an index "N" of edge-pairs are initiated to zero (step 312). Subsequently, the index N is incremented, the variable M is decremented, and an edge pair reliability metric, such as an edge-pair availability, is calculated based on input data gathered for an edge-pair associated with the current value of the index N (step 314). In one embodiment, the edge-pair reliability metric can be calculated using all routers and links on the shortest path(s) of an edge-pair.

The calculated edge-pair reliability metric associated with the edge-pair of the current index N is compared to the threshold, and if the value of the edge-pair reliability metric exceeds the threshold (step 316), Count is incremented (step 318). Next, the number of pairs of service edge point pairs M is compared to zero (step 320). If the variable M is greater than zero, the process repeats from step 314 to calculate the edge-pair reliability for additional edge-pairs. Otherwise, the edge-pair reliability for all edge-pairs is computed, and the end-to-end reliability metric is calculated by dividing the value of Count by the value of the index N (step 328).

An embodiment of the present invention is discussed generally with respect to a VoIP service supported over an IP Multimedia Subsystem (IMS). Some examples of user-oriented metrics to characterize VoIP service reliability are end-to-end service availability, defects per million (DPM), and the like. While these embodiments are discussed in relation to VoIP supported over IP Multimedia Subsystem (IMS) as an end-to-end IP service, those skilled in the art will recognize that these embodiments can be implemented for other services and network implementations. In addition to failure rates, the end-to-end service availability and DPM also can depend on failure detection time and fault recovery.

From a VoIP service perspective, users wish to be able to access a voice application, initiate a voice call, continue using the voice application with no interruption, and fulfill the initiated voice call at an acceptable quality. In other words, for a voice call to be completed successfully, the network elements traversed must be in an operational condition for the duration of the call. Once the specific subset of network elements that are used in a call is determined, modeling can then be developed to establish network objectives so as to meet service requirements.

Network elements include links (e.g., connections between nodes, such as fiber optic cable, twisted pair, radio frequency, etc.) and nodes (e.g. routers, SBCs, IMS servers, application servers, and their respective hardware and software components, such as cards, processors, power supplies, fans, operating systems, and application-layer software). The service reliability of VoIP depends on the reliability of the network elements that are traversed by the signaling flow and voice path. For a service end-to-end distribution, the access availability estimates can extend to the user sites at both ends and local networks can be added.

It is expected that the availability objectives of service providers for VoIP can preserve the high level of network reliability currently provided by the public switched telephone network (PSTN). For example, the carrier-grade five-9 availability is typically associated with the Class 4 or Class 5 switches in PSTN. This amounts to a downtime of 5.25 minutes/year, or 0.86 seconds/day. End-to-end service availability of VoIP services usually does not meet the five-9 level. For example, using the conventional approach of reference connections, an end-to-end (including local loops) availability of 99.93%, or about 368 minutes downtime per year can be typical for a single path.

To make the reliability of VoIP over IMS comparable to the PSTN requires the availability of IMS network elements to be higher than 99.93%. The network implementation and element availability can be a determining factor in the end-to-end availability (network reliability metric). Higher end-to-end availability can be achieved by IMS element redundancy and network diversity. For example, fully redundant IMS systems are typically located at two geographically separated sites in the backbone IP network so that when an IMS location is lost, users can be served by IMS core elements at another location.

Since SBCs are placed at network edges, the edge-to-edge unavailability of IMS core network connectivity can be tracked in terms of the unavailability for the associated routes connecting the SBCs. Specifically, the edge-pair availability distribution can map directly to the SBC-to-SBC availability distribution. The high percentiles of this distribution can then be used as a metric for the overall availability of the network. By adding user access availability estimates, end-to-end service availability can be derived.

The end-to-end service availability metric may not incorporate customer demands during outages. The defects per million (DPM) metric can provide a direct measure of customer demands that are not served. DPM can be computed as an average number of blocked calls and cutoff calls per million of attempted calls. Customer demands can be measured in terms of the number of call attempts generated over some time interval. A stable call, or a call in progress, is a call attempt that has been successfully established. A blocked call is a call attempt that was prevented from being successfully setup due to failures. A cutoff call occurs when a stable call is terminated prior to either party going "on-hook," or the call is abandoned by customer due to perceived poor quality.

As large carriers transport several hundred million calls per day, the DPM calculation can be averaged over a large sample. Like SBC-to-SBC availability, the preferred embodiments of the present invention can be used to estimate DPM based on the service provider's network topology rather than using a reference connection. Failure durations affect stable and new calls differently and can be accounted for in the determination of the DPM. For example, if the duration of a failure is less than a specific value, then it should not be considered in the estimation of DPM.

By using an edge-pair reliability metric distribution, an advantageous approach is presented that characterizes IP networks to provide more information on network reliability, such as availability or DPM, across an IP network and also advantageously defines and characterizes service reliability metrics associated with IP network implementations. Although availability and DPM have be used to illustrate the advantages of the preferred embodiments, those skilled in the art will appreciate that the preferred embodiments can apply this topology-based approach to derive other network performance metrics, such as PE-to-PE latency, and the like.

FIG. 4 illustrates an exemplary distribution 400 of an edge-pair reliability metric for edge-pairs in the network. The exemplary distribution 400 represents a distribution of the edge-pair reliability metric for edge pairs in a network. The distribution is depicted on a graph where the x-axis corresponds to the complement of availability (i.e., an unavailability level) and the y-axis corresponds to a fraction of PE router pairs. Curve 410 shows unavailability distribution independent of traffic, while curve 420 shows same with each PE pair weighted proportionally to its forecasted demand obtained from a traffic matrix.

The exemplary distribution 400 was derived for a network with more than 100 PE routers, and in spite of having more than 10,000 PE pairs, the range of values is quite narrow. Two PE nodes, which exist on every path, contribute the minimum unavailability of $40*10^{-6}$, and the elevated unavailability due to the additional nodes and links reaches high percentiles at $50*10^{-6}$ to $60*10^{-6}$, depending on the curve. The traffic-weighted curve has lower unavailability since the paths for the high-bandwidth PE pairs are the ones with fewer links.

Based on the above observations, instead of average availability objectives of five 9s or four 9s, a network can be characterized in terms of a percentage of PE pairs with a given level of availability. Using the exemplary distribution 400, an objective of 99% of the traffic from PE pairs with availability of 99.995% or better can be an achievable target for the network of this example. The reliability can be increased to approach a level of five 9s in this network by increasing redundancy. For example, the PE router pair availability of FIG. 4 can improve by implementing access to dual PE routers at the network edge. In this example, dual PE routers on both ends of the network can result in more than 70% of the PE pairs having better than five-9 availability.

FIG. 5 depicts an exemplary computing device 500 for establishing and/or determining edge-pair reliability metrics of a network and/or service offered over the network and network reliability metrics. The computing device 500 can be a mainframe, personal computer (PC), laptop computer, workstation, handheld device, such as a PDA, or the like. In the illustrated embodiment, the computing device 500 includes a central processing unit (CPU) 502 and preferably a display device 504. The display device 504 enables the computing device 500 to communicate directly with an operator through a visual display. The computing device 500 can further include data entry device(s) 506, such as a keyboard, touch screen, and/or mouse. The computing device 500 can include storage 508 to store data and instructions. The storage 508 can include such technologies as a floppy drive, hard drive, tape drive, Flash drive, optical drive, read only memory (ROM), random access memory (RAM), and the like. The storage 508 can include applications 510 including instructions for implementing those embodiments described herein.

Storage 508 can be local or remote to the computing device 500. The computing device 500 preferably includes a network interface 514 for communicating with the network 100. The CPU 502 operates to run the applications 510 in storage 508 by performing instructions therein and storing data resulting from the performed instructions, which may be presented to a user via the display 504 or by other mechanisms known to those skilled in the art, such as via a printer. The data can include a value for one or more reliability metrics for network, service, path, and/or element reliability.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of characterizing reliability associated with a network using a processor executing instructions for characterizing the reliability, the method comprising: determining a distribution of an edge-pair reliability metric for edge-pairs by the processor; comparing the edge-pair reliability metric for the edge-pairs in the distribution to a threshold value by the processor; counting a number of edge-pairs for which the edge-pair reliability metric exceeds the threshold value by the processor; and computing an end-to-end reliability metric characterizing reliability of the network with the processor based on the number of edge-pairs for which the edge-pair reliability metric exceeds the threshold value and a number of edge-pairs in the network.

2. The method of claim 1, wherein computing the end-to-end reliability metric comprises dividing the number of the edge-pairs that exceed the threshold value by the number of edge-pairs in the network.

3. The method of claim 1, wherein computing the end-to-end reliability metric comprises identifying a value corresponding to a certain percentile of the edge-pair reliability distribution.

4. The method of claim 1, wherein determining the value of the reliability metric is based on a topology of the network.

5. The method of claim 1, wherein determining a value of an edge-pair reliability metric for service edge point pairs comprises:
    determining possible paths between the edge-pairs; and
    calculating a reliability of the possible paths.

6. The method of claim 1, wherein the reliability metric is associated with an availability of the network.

7. The method of claim 1, wherein the reliability metric is associated with an availability of a service offered over the network.

8. The method of claim 7, wherein the service is a Voice over IP (VoIP) service.

9. The method of claim 1, wherein determining a value of an edge-pair reliability metric is based on at least one of model data, historical data, and production data.

10. The method of claim 1, further comprising determining whether to incorporate at least one of additional nodes and links in the network to increase the level of the end-to-end reliability metric based on a value of the end-to-end reliability metric.

11. The method of claim 1, wherein determining a distribution comprises weighting the edge-pair reliability metric based on at least one of the bandwidth of a path between edge-pairs and the amount of traffic between the edge-pairs.

12. A system for characterizing reliability associated with a network comprising:
    a computing device configured to:
        determine a distribution of an edge-pair reliability metric for edge-pairs,
        compare the edge-pair reliability metric for the edge-pairs in the distribution to a threshold value;
        count a number of edge-pairs for which the edge-pair reliability metric exceeds the threshold value; and
        compute an end-to-end reliability metric characterizing reliability of the network based on the number of edge-pairs for which the edge-pair reliability metric exceeds the threshold value and a number of edge-pairs in the network.

13. The system of claim 12, wherein the computing device is configured to compute the end-to-end reliability metric by dividing the number of the edge-pairs that exceed the threshold value by the number of edge pairs in the network.

14. The system of claim 12, wherein the computing device is configured to compute the end-to-end reliability metric by identifying a value corresponding to a certain percentile of the edge-pair reliability distribution.

15. The system of claim 12, wherein the computing device is configured to determine whether to incorporate at least one of additional nodes and links in the network to increase the level of the end-to-end reliability metric based on a value of the end-to-end reliability metric.

16. The system of claim 12, wherein the computing device is configured to determine the distribution by weighting the edge pair reliability metric based on at least one of a bandwidth of a path between edge-pairs and an amount of traffic between the edge-pairs.

17. A non-transitory computer-readable medium storing instructions, wherein execution of the instructions by at least one computing device facilitates characterizing reliability associated with a network by:
    determining a distribution of an edge-pair reliability metric for edge-pairs comparing the edge-pair reliability metric for the edge-pairs in the distribution to a threshold value;
    counting a number of edge-pairs for which the edge-pair reliability metric exceeds the threshold value; and
    computing an end-to-end reliability metric characterizing reliability of the network based on the number of edge-pairs for which the edge-pair reliability metric exceeds the threshold value and a number of edge-pairs in the network.

18. The medium of claim 17, wherein computing the end-to-end reliability metric comprises dividing the number of the edge-pairs that exceed the threshold value by the number of edge-pairs in the network.

19. The medium of claim 17, wherein computing the end-to-end reliability metric comprises identifying a value corresponding to a certain percentile of the edge-pair reliability distribution.

20. The medium of claim 17, wherein determining the distribution comprises weighting the edge pair reliability metric based on at least one of a bandwidth of a path between edge-pairs and an amount of traffic between the edge-pairs.

* * * * *